(12) United States Patent
Chen

(10) Patent No.: US 12,414,554 B2
(45) Date of Patent: Sep. 16, 2025

(54) FISHING REEL WITH A ONE-HAND SWITCHING MECHANISM

(71) Applicant: Cixi Energy Refined Fishing Co., Ltd., Cixi (CN)

(72) Inventor: Yonggang Chen, Cixi (CN)

(73) Assignee: Cixi Energy Refined Fishing Co., Ltd., Cixi (CN)

( * ) Notice: Subject to any disclaimer, the term of this patent is extended or adjusted under 35 U.S.C. 154(b) by 268 days.

(21) Appl. No.: 18/298,405

(22) Filed: Apr. 11, 2023

(65) Prior Publication Data

US 2023/0337649 A1 Oct. 26, 2023

(30) Foreign Application Priority Data

Apr. 25, 2022 (CN) .......................... 202220987377.0

(51) Int. Cl.
*A01K 89/015* (2006.01)

(52) U.S. Cl.
CPC .... *A01K 89/01902* (2015.05); *A01K 89/0192* (2015.05)

(58) Field of Classification Search
CPC .. A01K 89/015; A01K 89/033; A01K 89/016; A01K 89/01902; A01K 89/0186; A01K 89/0187; A01K 89/0188; A01K 89/0189; A01K 89/01901; A01K 89/0155; A01K 89/01903; A01K 89/01909; A01K 89/01908; A01K 89/0193; A01K 89/01931; A01K 89/01928; A01K 89/0192
USPC ....................................................... 242/263
See application file for complete search history.

(56) References Cited

U.S. PATENT DOCUMENTS

| | | | | |
|---|---|---|---|---|
| 890,892 | A * | 6/1908 | Douglass | A01K 89/0189 242/261 |
| 1,463,828 | A * | 8/1923 | Malleson | A01K 89/015 242/260 |
| 1,980,345 | A * | 11/1934 | Long | A01K 89/015 242/270 |
| 2,076,097 | A * | 4/1937 | Schafer | A01K 89/01909 242/260 |
| 2,130,670 | A * | 9/1938 | Maynes | A01K 89/016 192/100 |
| 2,417,732 | A * | 3/1947 | Bland | A01K 89/015 242/270 |

(Continued)

FOREIGN PATENT DOCUMENTS

| | | | | |
|---|---|---|---|---|
| CN | 104115798 | A * | 10/2014 | ....... A01K 89/01928 |
| CN | 215224132 | U | 12/2021 | |
| FR | 2497064 | A * | 7/1982 | ........... A01K 89/016 |

*Primary Examiner* — Anna M Momper
*Assistant Examiner* — Henrix Soto
(74) *Attorney, Agent, or Firm* — JEEN IP LAW, LLC

(57) ABSTRACT

A fishing reel that is easy to switch with one hand, comprising a fishing reel frame; a fishing reel line spool, which is rotatably connected to the fishing reel frame for retrieving and releasing the fishing line; a fishing reel handle, which is located on the side where the fishing reel line spool is located; a transmission component, which is provided between the fishing reel handle and the fishing reel line spool; a clutch component, which acts on the transmission component. The clutch component comprises a clutch lever, which extends at least partially out of the fishing reel frame and is located on the side of the fishing reel frame away from the fishing reel handle.

9 Claims, 13 Drawing Sheets

(56) References Cited

U.S. PATENT DOCUMENTS

| | | | | | |
|---|---|---|---|---|---|
| 2,573,240 | A | * | 10/1951 | Berlinger | A01K 89/01931 242/321 |
| 2,598,846 | A | * | 6/1952 | Smith | A01K 89/016 242/147 R |
| 2,643,131 | A | * | 6/1953 | King | A01K 89/0193 242/321 |
| 2,859,924 | A | * | 11/1958 | Sarah | A01K 89/0189 242/298 |
| 3,432,114 | A | * | 3/1969 | Meisner | A01K 89/033 242/271 |
| 3,612,437 | A | * | 10/1971 | Allebach | A01K 89/015 192/114 R |
| 3,916,715 | A | * | 11/1975 | Covey | A01K 89/0189 74/414 |
| 4,049,217 | A | * | 9/1977 | Koopman | A01K 89/0162 242/298 |
| 4,142,694 | A | * | 3/1979 | Rankin, Jr. | A01K 89/0189 242/260 |
| 4,572,455 | A | * | 2/1986 | Noda | A01K 89/01903 242/282 |
| 5,201,477 | A | * | 4/1993 | Kawabe | A01K 89/0179 242/245 |
| 2015/0090823 | A1 | * | 4/2015 | Kobayashi | A01K 89/015 242/261 |

\* cited by examiner

FISHING REEL WITH A ONE-HAND SWITCHING MECHANISM

CROSS-REFERENCE TO RELATED APPLICATIONS

This application claims priority to Chinese Utility Application No. 202220987377.0, filed on Apr. 25, 2022, and Chinese Utility Application No. 202222161546.8, filed on Aug. 16, 2022. The disclosures of these applications are incorporated herein for all purposes by reference in their entirety.

TECHNICAL FIELD

This disclosure relates to the technical field of fishing gear, in particular to a fishing reel with a one-hand switching mechanism.

BACKGROUND

Fishing is an outdoor sport that aims to catch fish out of the water with fishing gear. Besides, fishing is not limited to gender and age, so both adults and children like it. Fishing is close to nature and cultivates ones' taste, so it has been enthusiastically sought after by the majority of enthusiasts.

Generally, fishing reels are divided into two categories: conventional reel, whose line arranging direction is parallel to the line outgoing direction, and spinning reel, whose line arranging direction is perpendicular to the line outgoing direction. The fishing reel is assembled on the fishing rod and then the status of the fishing reel line spool can be observed. If the fishing reel line spool must rotate to retrieve or release the fishing line, and at the same time, the fishing line does not need to go through a large angle of rotation when it is winding into the fishing reel line spool, in other words, it goes into the fishing reel line spool in an almost parallel direction, then it is a conventional reel. On the contrary, it is spinning reel if the fishing reel line spool does not need to rotate to retrieve or release the line (in some circumstances the fishing reel line spool will rotate when a fishing line goes out) and the action of winding the fishing line is taken by a winding arm, besides, the fishing line must take a nearly ninety-degree turn to go into the fishing reel line spool.

Ice fishing is a relatively special kind of fishing, which refers to a kind of fishing activity carried out on ice in winter. The ice fishing rods used for this activity are also very special in that, in addition to the short fishing rods, they also need to be equipped with reels, which are a relatively important part. There are also many different types of reels which have different shapes, advantages and disadvantages. Therefore, choosing the right reel that suits you best matters a lot.

At present, most ice fishing reels on the market are replaced by raft reels, but the clutch and release switches of the raft reels are all designed in the middle above the raft reels near the foot seat position, besides, the knob is very short, which is very uncoordinated when used with ice fishing rods with gun handles and inconvenient to operate.

Referring to patent document CN215224132U, which relates to a kind of ice fishing reel with adjustable length of clutch lever, comprising: a base; a reel foot seat; a line spool; and a clutch assembly; the right end of the clutch shaft passes through the base and is connected with the lever, a flat hole corresponding to the clutch shaft is provided near the rear end of the lever, a regulation rod is connected to the front side of the lever, a strip regulation hole is provided near the rear end of the side wall of the regulation rod, several screw holes are provided on the lever in front of the flat hole, the screw holes are aligned with the strip regulation hole and fixed by inserting a second screw. The structure design of the ice fishing reel with adjustable length of clutch lever of the present disclosure is reasonable. The lever connected with the regulation rod is connected to the right end of the transmission shaft. The length of the front extension of the regulation rod can be adjusted by matching with different screw holes through the strip regulation hole. The user can easily operate the clutch assembly by hooking or pressing the regulation rod with his fingers, which is convenient and practical.

The defects of the above-mentioned patented products at least include: the handle and the lever are both provided on the same side of the fishing reel frame which is away from the reel line spool, limited by their existence, the structure of the lever needs to be made small to prevent interference when they are used, but due to the small size of the lever, it generally needs to be stopped for the handle before switching the function of the lever, which is inconvenient to operate; and because they are on the same side, it is difficult to operate the handle and the lever at the same time with both hands.

In order to overcome the above defects, some manufacturers arrange the handle on the side away from the reel line spool, and at the same time they use buttons instead of the lever structure and set the buttons on the side close to the reel line spool, so that the handle and the button are spaced apart, so the button can be operated when the handle is rotating. However, it also has certain disadvantages, that is, when you are rotating the reel in one hand (the reel is not installed on the fishing rod), if you use the other hand to drag the handles or buttons, and there is no free hand to operate the other handle or button simultaneously. Forcibly using it may cause instability and dropping.

Therefore, there is an urgent need for a fishing reel that uses the lever to control the clutch and the lever and the handle are arranged on different sides of the fishing reel frame.

SUMMARY

In order to overcome the above-mentioned deficiencies of the prior art, the present disclosure provides a fishing reel with a one-hand switching mechanism.

The technical solution of the present disclosure for solving the technical problem is: a fishing reel with a one-hand switching mechanism, comprising:
  A fishing reel frame;
  A fishing reel line spool, which is rotatably connected to the fishing reel frame for retrieving and releasing the fishing line;
  A fishing reel handle, which is located on the side where the fishing reel line spool is located;
  A transmission assembly, which is provided between the fishing reel handle and the fishing reel line spool;
  A clutch assembly, which acts on the transmission assembly to make the transmission assembly has at least an engaged state and a disengaged state. When the transmission assembly is in the engaged state, the fishing reel handle and the fishing reel line spool is in a transmission fit; when the transmission assembly is in the disengaged state, the fishing reel handle and the fishing reel line spool is in a transmission failure, so the fishing reel line spool can rotate freely.

The clutch assembly comprises a clutch lever which extends at least partially out of the fishing reel frame and is located on the side of the fishing reel frame away from the fishing reel handle.

Further setting of the above technical solution is that the clutch assembly also includes a drive sleeve;

the clutch lever is movably installed in the fishing reel frame, the inner end of the clutch lever is in transmission connection with the drive sleeve and the outer end extends out of the fishing reel frame;

the drive sleeve is rotatably arranged in the fishing reel frame, and the upper surface of the drive sleeve is provided with a drive part with different heights that acts on the transmission assembly;

the clutch lever is actuated to make the drive sleeve rotate relative to the transmission assembly, thereby driving the transmission assembly up or down through the drive part, and thus switching the transmission assembly between the engaged state and the disengaged state.

Further setting of the above technical solution is that the drive sleeve comprises a sleeve body, a drive part fixed on the sleeve body, a connecting part extending outwardly from one side of the sleeve body, and the clutch lever is connected to the connecting part.

A reset spring is provided between the fishing reel frame and the drive sleeve. A through hole is provided on the sleeve body.

Preferably, the drive part comprises two drive ribs symmetrically arranged around the through hole, and a positioning groove is provided between the two drive ribs.

Further setting of the above technical solution is that the transmission assembly comprises a fishing reel handle shaft connected to the fishing reel handle, a fishing reel handle gear sleeved on the fishing reel shaft, a main shaft component fixed in the fishing reel frame and passing through the fishing reel line spool, a main shaft gear sleeved on the main shaft component, and a toothed bushing fixed in the fishing reel line spool, wherein the gear of the fishing reel handle is meshed with the main shaft gear, and the main shaft gear forms an engageable connection with the toothed bushing.

Further setting of the above technical solution is that the main shaft component comprises a main shaft sleeve and a main shaft rod which passes through and is provided in the main shaft sleeve and can move back and forth along the main shaft sleeve. The main shaft sleeve is in fixed connection with the fishing reel frame.

Preferably, the main shaft sleeve is provided with a track groove, the main shaft rod is provided with a first connection pin which is inserted into the track groove.

In some embodiments of the present disclosure, the main shaft sleeve is provided with a spring, one end of which abuts against the fishing reel frame, and the other end abuts against the main shaft rod.

In some embodiments of the present disclosure, a positioning sleeve is further provided between the main shaft sleeve and the main shaft gear, one end of which is provided with a press cover which abuts against one of the end faces of the main shaft gear; the other end of the positioning sleeve is provided with a second connection pin, which abuts against the other end face of the main shaft gear and is provided between the main shaft sleeve and the main shaft rod.

In some embodiments of the present disclosure, the fishing reel frame is a plastic fishing reel frame and a metal installation guard plate is provided between the fishing reel line spool and the plastic fishing reel frame, the edge of which is bent to one side to form a guide part, on which an outlet hole is provided;

The fishing reel frame has a closed side and an open side. The fishing reel handle is provided on the open side of the fishing reel frame and the clutch lever is provided on the closed side of the fishing reel frame.

The working principle of the clutch switching of the present disclosure is: the user clings to the clutch lever and the clutch lever drives the drive sleeve to rotate, so the main shaft rod is driven to move through the cooperation relationship between the drive part and the first connection pin, and the main shaft gear is driven to disengage from the toothed bushing through the main shaft rod, at this time, the transmission between the fishing reel line spool and the fishing reel frame is separated. The fishing reel line spool can be freely rotated to achieve the function of quick retrieval and release of the line. Reverse operation of the clutch lever, the main shaft gear and the toothed bushing are meshed, so that the transmission between the fishing reel line spool and the fishing reel handle is realized, and the fishing reel line spool is rotated together by shaking the fishing reel handle, so as to achieve the function of retrieving the line.

The beneficial effects of the present disclosure are as follows:

1. By cooperating with the clutch lever and the drive sleeve, the transmission assembly can be actuated to switch the transmission assembly between the engaged state and the disengaged state, so as to realize the transmission clutch function between the fishing reel line spool and the fishing reel handle.
2. By adopting the double-sided setting, the user can use both hands separately when switching, that is, one hand operates the fishing reel handle, and the other palm drags the fishing reel frame while the fingers push the lever, so the operation is faster and the control of the entire flying fishing reel is more stable and not easy to drop.
3. The fishing reel line spool is always located on the side close to the human body, while the fishing reel frame is located on the side away from the human body, which will not block the line of sight, allowing users to observe the speed of the fishing reel line spool in real time. When the line is exploded or tangled, it can be discovered in time, and no hand needs to be changed during operation, which is very convenient and meets the user's usage habits.
4. The drive sleeve with non-standard structure is adopted, which can not only drive the main shaft component to realize the switching of the clutch state, but also stably accommodate the first shaft pin at a specific angle, so that the whole fishing reel can be stably kept in the engaged state.
5. the fishing reel handle and the clutch lever can be arranged on the opposite side, so that the user's two hands can move separately when switching, that is, one hand operates the fishing reel handle and the other hand drags the fishing reel frame (fishing rod) while the finger dials the clutch lever, so it is easier and faster to operate, so the control of the whole ice fishing reel (fishing reel) is more stable and not easy to drop. On the other hand, the fishing reel line spool is installed on the open side, making it easier for users to observe the real-time dynamics of the fishing reel line spool when in use.

Figure 1:
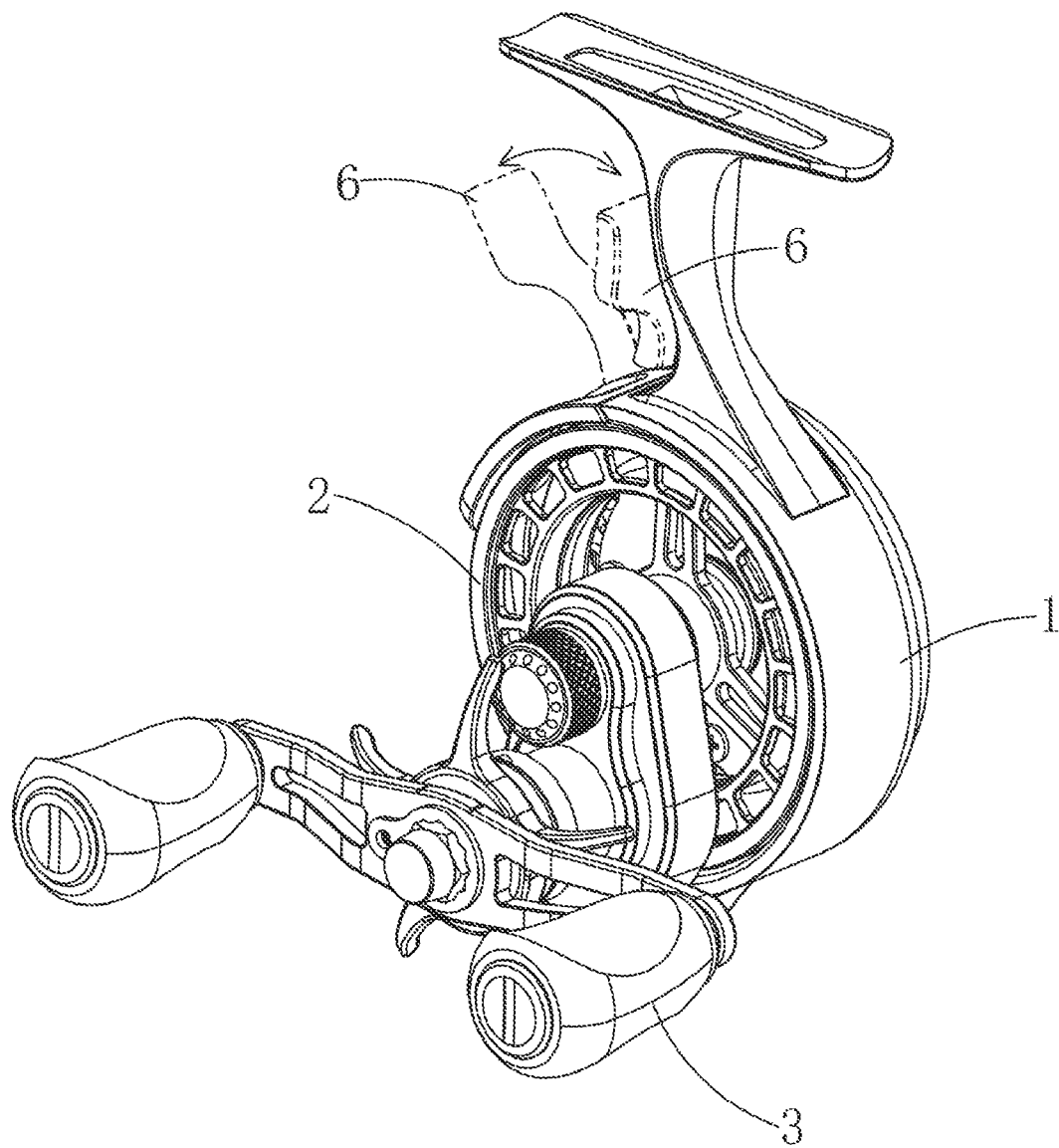
FIG. 1 is a schematic view of the appearance of the present disclosure.

In the drawings: 1, fishing reel frame; 2, fishing reel line spool; 3, fishing reel handle; 5, clutch assembly; a, engaged state; b, disengaged state; 6, clutch lever; 7, drive sleeve; 8, drive part; 9, sleeve body; 10, connection part; 11, reset spring; 12, through hole; 13, drive rib; 14, positioning groove; 14a, flat surface; 15, fishing reel handle shaft; 16, fishing reel handle gear; 17, main shaft gear; 18, toothed bushing; 19, main shaft sleeve; 20, main shaft rod; 21, track groove; 22, first connection pin; 23, positioning sleeve; 23a, press cover; 24, second connection pin; 25, spring; 26, plastic fishing reel frame; 26a, closed side; 26b, open side; 27, metal installation guard plate; 27a, guide part; 27b, outlet hole; 28, hand part; 29, fishing rod.

DETAILED DESCRIPTION

In combination with the accompanying drawings and specific embodiments, the present disclosure is further disclosed. It should be noted that the embodiments are only a specific description of the present disclosure, for the purpose of enabling those skilled in the art to better understand the technical solutions of the present disclosure, and should not be construed as a limitation of the present disclosure.

In the description of the present disclosure, it should be noted that the directions or positional relationships indicated by terms such as "center", "top", "bottom", "left", "right", "vertical", "horizontal", "inner" and "outer" are based on the directions or positional relationships shown in the accompanying drawings, which are merely for the purpose of facilitating the description of the present disclosure and simplifying the description, and therefore should not be understood as a limitation of the present disclosure.

In the description of the present disclosure, it should be noted that, unless otherwise specified and limited, terms such as "installation", "connection" and "connection" should be interpreted in a broad sense, for example, it can be a fixed connection, a detachable connection or an integral connection; it can be a mechanical connection or an electrical connection; it can be a direct connection or an indirect connection through an intermediate medium; and it can be an internal connection between two components. For those skilled in the art, the specific meanings of the above terms in the present disclosure can be understood in specific circumstances.

Referring to FIGS. 1 to 13, a fishing reel with a one-hand switching mechanism, comprising:

A fishing reel frame 1;

A fishing reel line spool 2, which is rotatably connected to the fishing reel frame 1 for retrieving and releasing the fishing line;

A fishing reel handle 3, which is located on the side where the fishing reel line spool 2 is located;

A transmission assembly, which is provided between the fishing reel handle 3 and the fishing reel line spool 2;

A clutch assembly 5, which acts on the transmission assembly to make the transmission assembly has at least an engaged state a and a disengaged state b; when the transmission assembly is in the engaged state, the fishing reel handle 3 and the fishing reel line spool 2 is in a transmission fit; when the transmission assembly is in the disengaged state, the fishing reel handle 3 and the fishing reel line spool 2 is in a transmission failure, so the fishing reel line spool 2 can rotate freely.

The clutch assembly 5 comprises a clutch lever 6, which extends at least partially out of the fishing reel frame 1 and is located on the side of the fishing reel frame 1 away from the fishing reel handle 3.

Preferably, the fishing reel handle 3 is arranged on the side close to the fishing reel line spool 2, and the lever is arranged on the side away from the fishing reel line spool 2 (close to the fishing reel frame 1), which is suitable for ergonomic operation by both left and right hands.

The present disclosure has a special restriction on the relative position of the clutch lever 6 and the fishing reel handle 3, that is, they are respectively arranged on both sides of the fishing reel frame 1, so that in the process of operating one of the clutch lever 6 and the fishing reel handle 3, there is no interference from the other. On the other hand, since the double-sided setting is adopted, the user can use both hands when switching, that is, one hand operates the fishing reel handle 3, and the other hand drags the fishing reel frame 1 while the fingers push the lever, so the operation is faster and the control of the entire ice fishing reel is more stable and not easy to fall off.

A further preferred setting for embodiment one is that the clutch assembly 5 also comprises a drive sleeve 7; the clutch lever 6 is movably installed in the fishing reel frame 1, the inner end of the clutch lever 6 is in transmission connection with the drive sleeve 7 and the outer end extends out of the fishing reel frame 1; the drive sleeve 7 is rotatably arranged in the fishing reel frame 1, and the upper end face of the drive sleeve 7 is provided with a drive part 8 with different heights that act on the transmission assembly; when the clutch lever 6 is pulled, the drive sleeve 7 is rotated relative to the transmission assembly, thereby driving the transmission assembly up or down through the drive part 8, and thus the transmission assembly is switched between the engaged state a and the disengaged state b. By adopting the preferred solution, the action mechanism when in use is that when the clutch lever 6 is pulled, the drive sleeve 7 is rotated relative to the transmission assembly, thereby driving the transmission assembly up or down through the drive part 8, and thus the transmission assembly is switched between the engaged state a and the disengaged state b.

Figure 11:
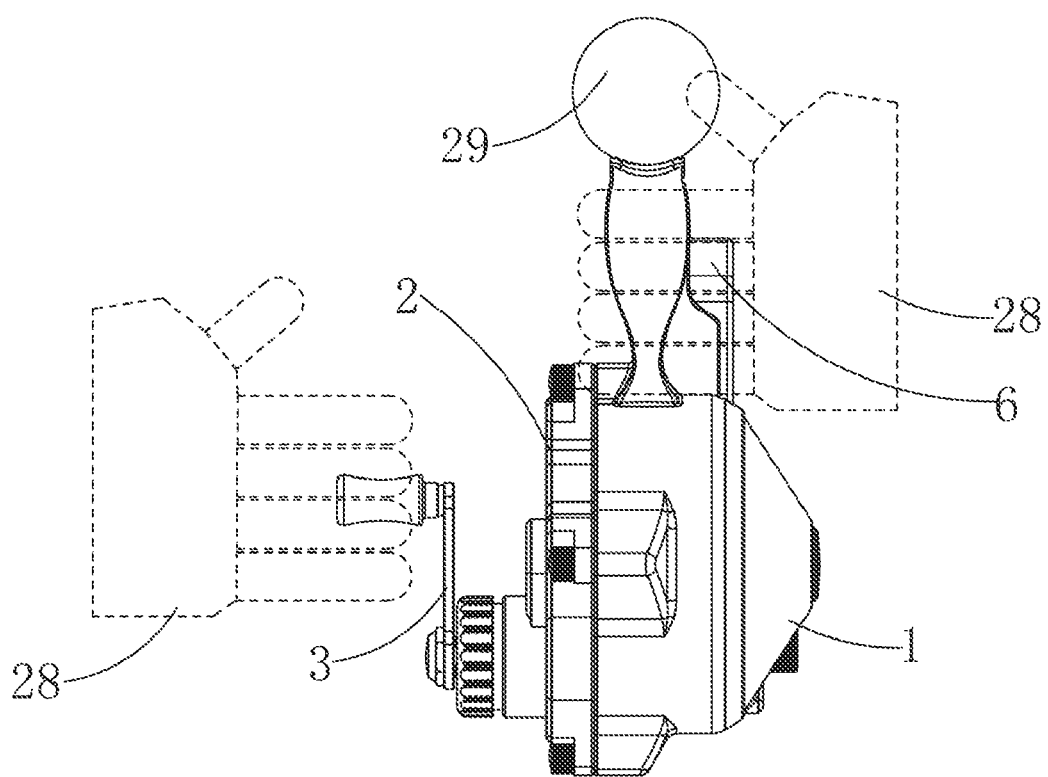
FIG. 11 is a schematic diagram of the positional relationship between the fishing reel and the hand when the present disclosure is used.
Figure 12:
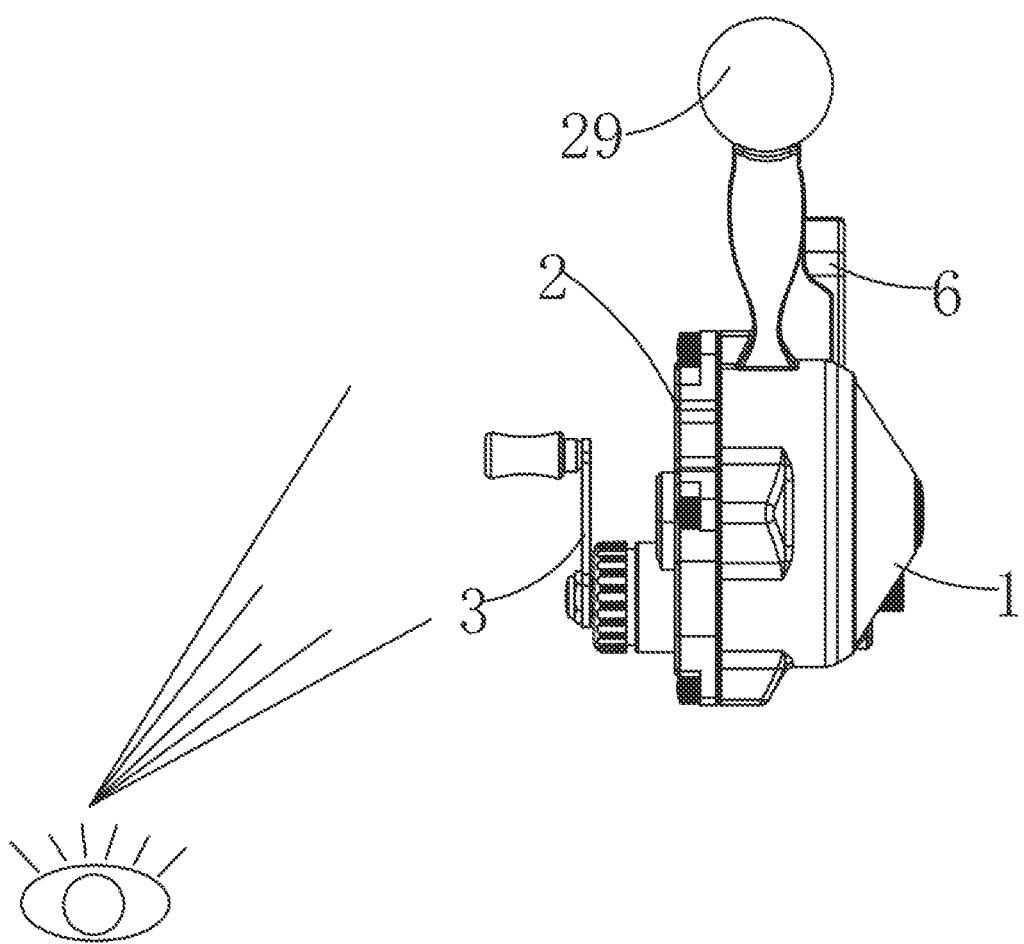
FIG. 12 is a schematic diagram of the sight observation when the present disclosure is used.
Figure 13:
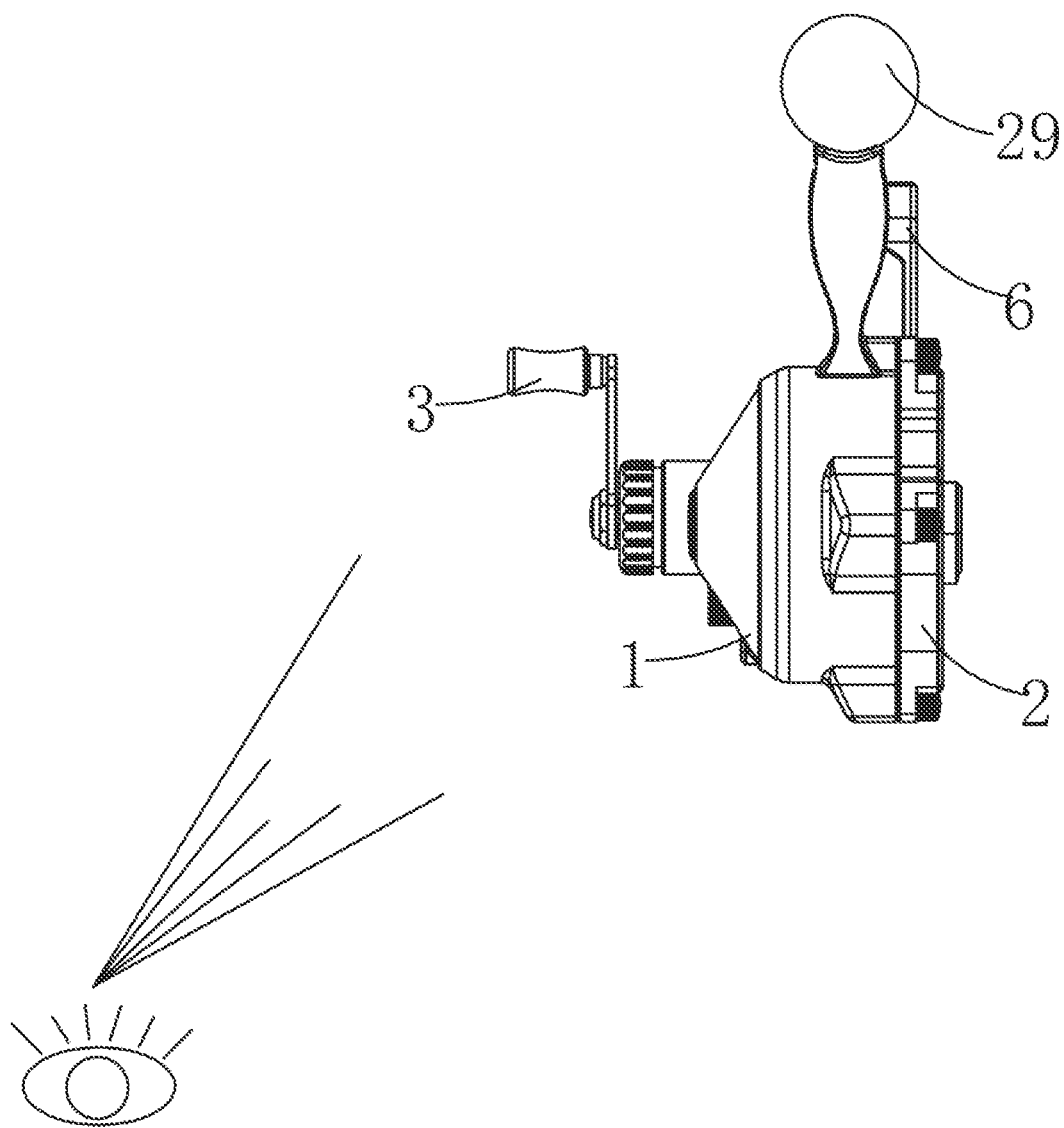
FIG. 13 is a schematic diagram of the sight observation when the prior art is used.

As shown in FIG. 11, when the user uses the fishing reel with the invented structure and it is installed on the fishing rod 29, one hand 28 holds the fishing reel handle 2 for operation, and the other hand 28 can, in the pencil grip posture, drag the fishing reel frame 1 (fishing rod 29) while the fingers push the clutch lever 6 to realize the operation and use of various functions. As shown in FIG. 12, the fishing reel line spool 2 is always located on the side close to the human body, while the fishing reel frame 1 is located on the side away from the human body, which will not block the line of sight, allowing users to observe the speed of the fishing reel line spool 2 in real time. When the line is exploded or tangled, it can be discovered in time, and no hand needs to be changed during operation, which is very convenient and meets the user's usage habits.

Embodiment Two

Figure 4:
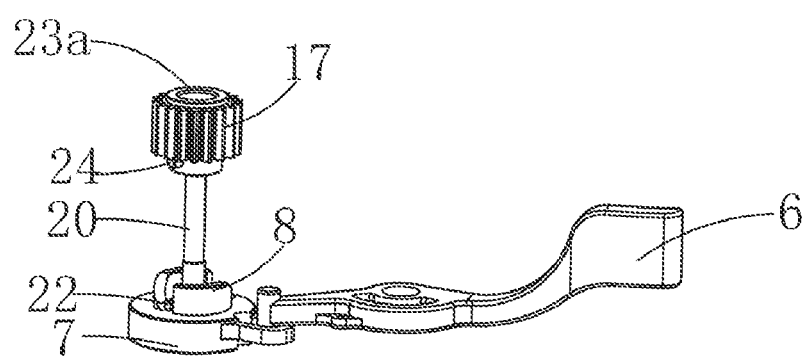
FIG. 4 is a schematic structure view of the clutch assembly and the main shaft in their engaged state.
Figure 5:
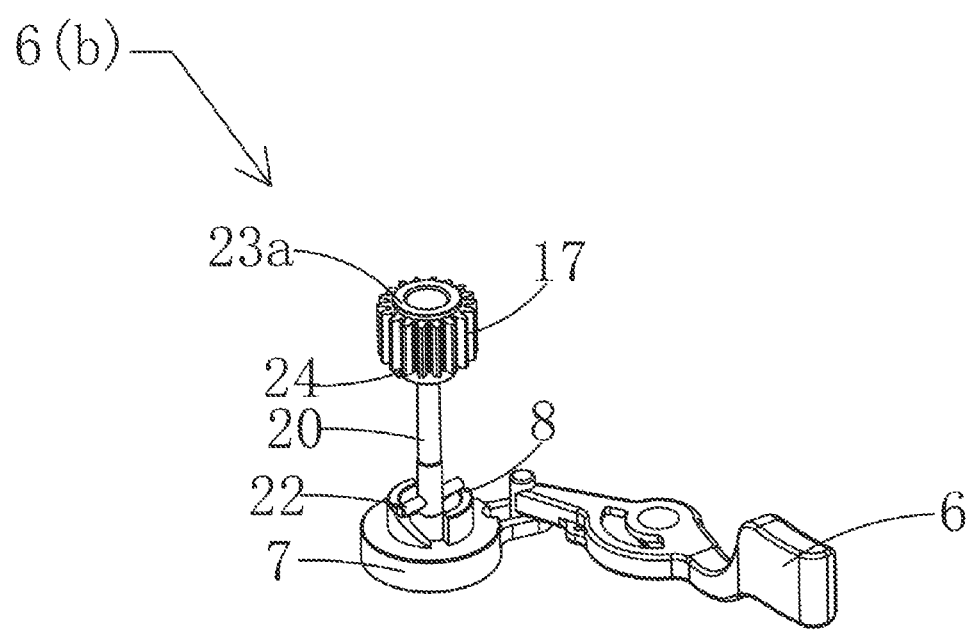
FIG. 5 is a schematic structure view of the clutch assembly and the main shaft in their disengaged state.
Figure 10:
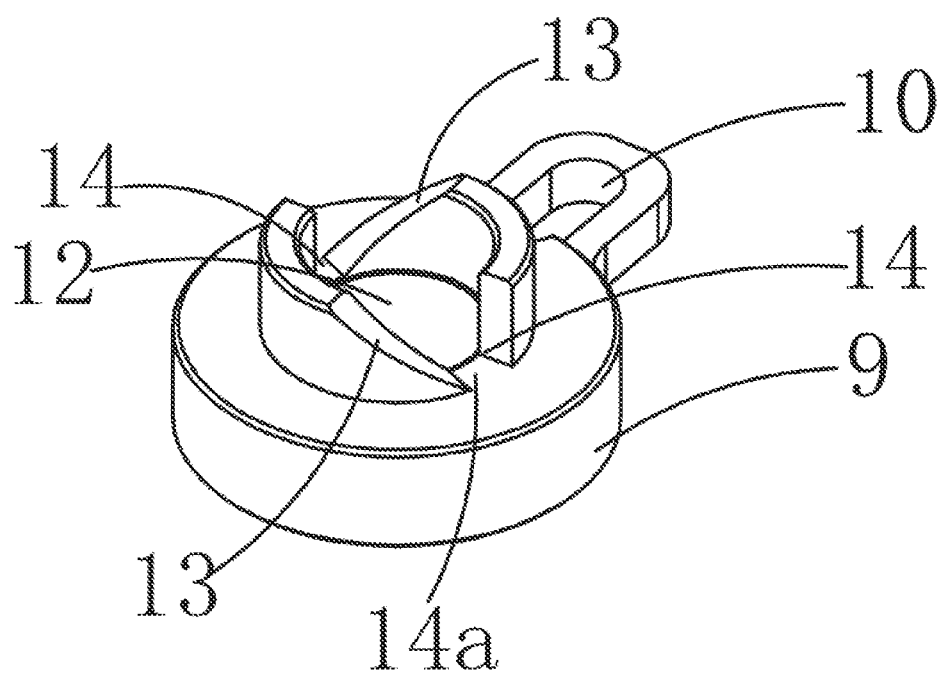
FIG. 10 is a schematic diagram of the structure of the drive sleeve.

In the basic solution of embodiment one, this embodiment expands the drive sleeve 7, and its specific structure is preferably as follows: referring to FIGS. 4, 5 and 10, comprising a sleeve body 9, a drive part 8 fixed on the sleeve body 9, a connection part 10 extending outwardly from one side of the sleeve body 9, and the clutch lever 6 is connected with the connection part 10 to achieve transmission fit; a reset spring 11 is provided between the fishing reel frame 1 and the drive sleeve 7. When the clutch lever 6 is actuated, the reset spring 11 is deformed under the action of force. Once the user releases the clutch lever 6, under the elastic reset force of the reset spring 11, the transmission assembly can be switched to the engaged state a through the clutch assembly 5; a through hole 12 is provided on the sleeve body 9 for passing through the main shaft component.

Preferably, the drive part 8 comprises two drive ribs 13 symmetrically arranged around the through hole 12. According to the connection relationship of each part, the drive sleeve 7 rotates along the axis of the main shaft component under the action of the clutch lever 6. Therefore, the drive rib 13 is arranged symmetrically in the center, so as to exert the same force on both ends of the first connection pin 22 to make the motion smoother. In addition, a positioning groove 14 is provided between the two drive ribs 13, and the bottom surface of the positioning groove 14 is preferably a flat surface 14a, so that the first connection pin 22 can be located in the positioning groove 14 more stably without toggling the clutch lever 6.

Embodiment Three

In the basic solution of embodiment one, this embodiment expands the transmission assembly, and its specific structure is preferably as follows: referring to FIGS. 2~3 and FIGS. 7~8. The transmission assembly comprises includes a fishing reel handle shaft 15 connected to the fishing reel handle 3, a fishing reel handle gear 16 sleeved on the shaft of the fishing reel handle 3, a main shaft component fixed in the fishing reel frame 1 and passing through the fishing reel line spool 2, a main shaft gear 17 sleeved on the main shaft component, and a toothed bushing 18 fixed in the fishing reel line spool 2, wherein the gear of the fishing reel handle 3 is meshed with the main shaft gear 17, and the main shaft gear 17 forms an engageable connection with the toothed bushing 18.

When the user pulls the clutch lever 6, the main shaft gear 17 is pushed up by the main shaft components, causing the main shaft gear 17 to be separated from the toothed bushing 18 and unable to transmit, thus allowing the fishing reel line spool 2 to rotate freely. Once the clutch lever 6 is released, under the action of the reset spring 11 and other components, the main shaft gear 17 is reset by the transfer shaft components, and at this time the main shaft gear 17 is at least partially meshed with the toothed bushing 18, and the other part is meshed with the gear of fishing reel handle 3, so that the fishing reel handle 3 can be engaged with the fishing reel line spool 2 through the transmission assembly.

Embodiment Four

Figure 2:
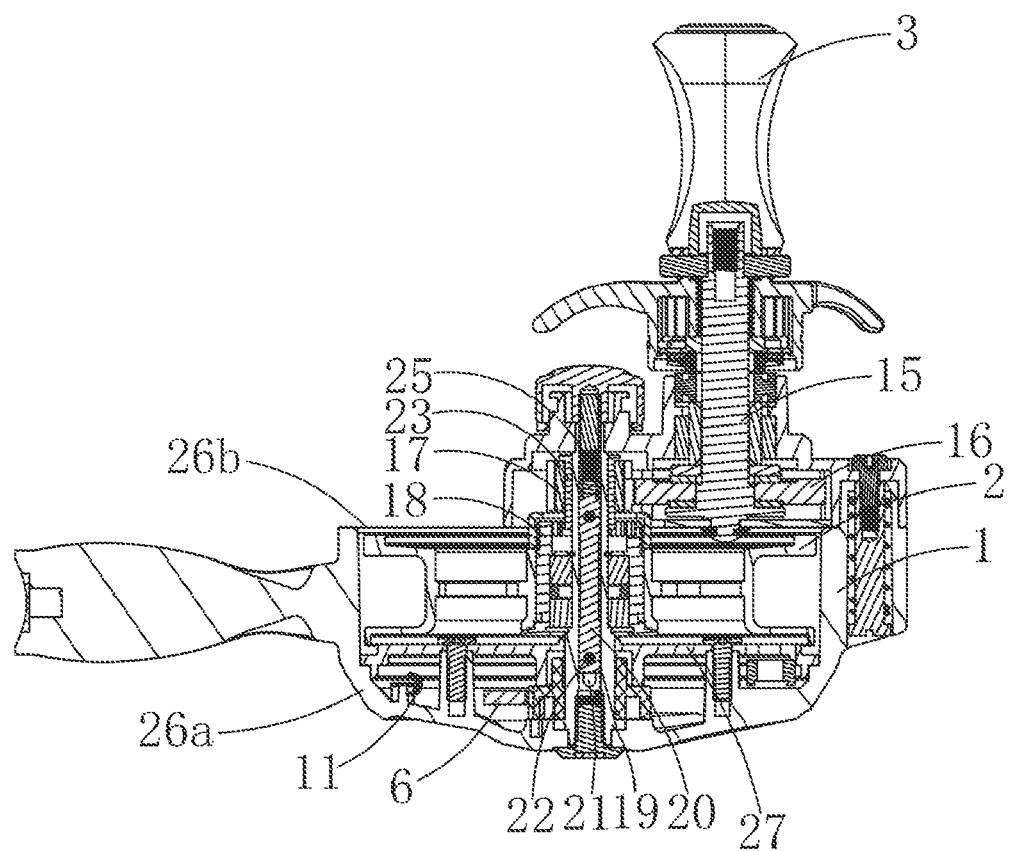
FIG. 2 is a sectional view of the present disclosure in its disengaged state.
Figure 3:
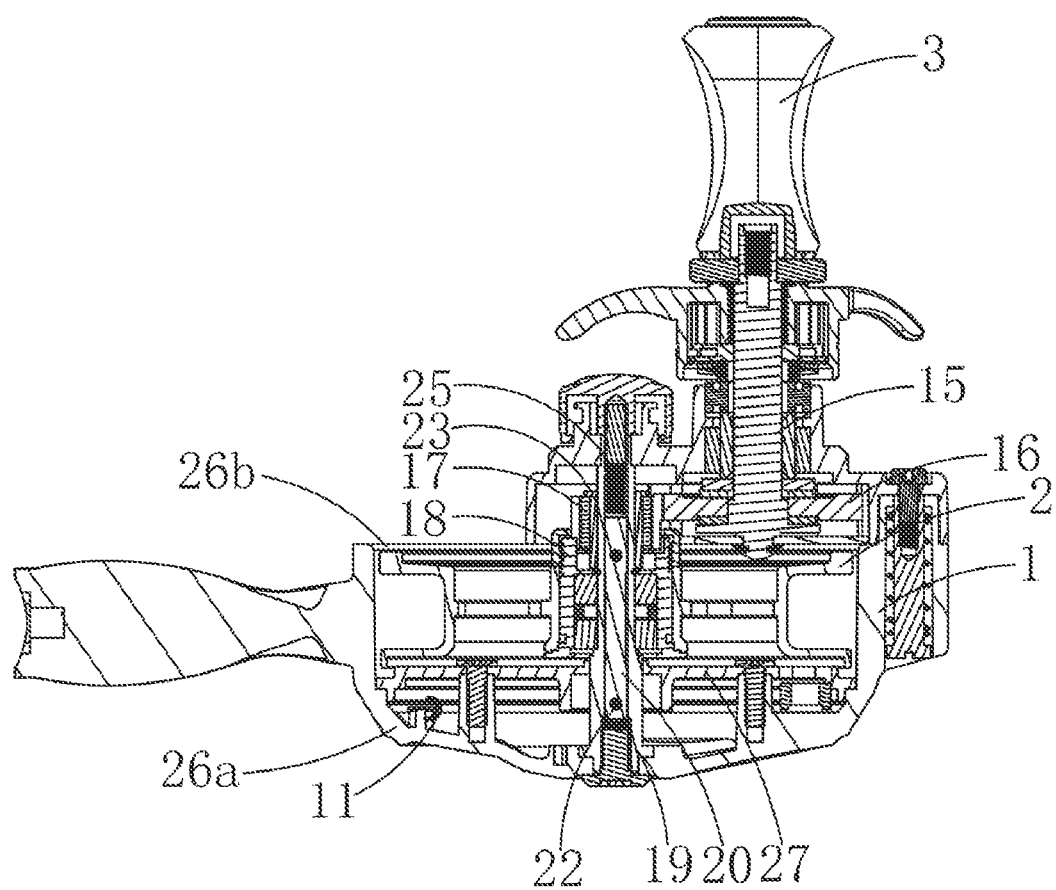
FIG. 3 is a sectional view of the present disclosure in its engaged state.

In the basic solution of embodiment one, this embodiment expands the main shaft component, and its specific structure is preferably as follows: referring to FIGS. 2~3 and 6, the main shaft component comprises a main shaft sleeve 19, and a main shaft rod 20 which is passes through and is provided in the main shaft sleeve 19 and can move back and forth along the main shaft sleeve 19. The main shaft sleeve 19 is in fixed connection with the fishing reel frame 1, and the main shaft sleeve 19 plays a major role in installation and protection.

The main shaft rod 20 is mounted in the main shaft sleeve 19 and is capable of moving within a predetermined range along the main shaft sleeve 19, and is further connected to the main shaft gear 17 to control the relative position and motion relationship between the main shaft gear 17 and the toothed bushing 18.

Preferably, the main shaft sleeve 19 is provided with a track groove 21, and the main shaft rod 20 is provided with a first connection pin (22) which is inserted into the track groove 21. Through the cooperation of the first connection pin 22 and the track groove 21, the movement of the main shaft rod 20 is guided, and at the same time, the slipping prevention effect is achieved.

Due to the fact that the position of the main shaft gear 17 needs to be continuously changed during the clutch switching, in order to increase its stability, the following structure is adopted: a positioning sleeve 23 is further provided between the main shaft sleeve 19 and the main shaft gear 17, one end of which is provided with a press cover 23a which abuts against one of the end faces of the main shaft gear 17; the other end of the positioning sleeve 23 is provided with a second connection pin 24, which abuts against the other end face of the main shaft gear 17 and is provided between the main shaft sleeve 19 and the main shaft rod 20. On the one hand, the two ends of the main shaft gear 17 are limited by the press cover 23a and the second connection pin 24 so that it can always move with the main shaft components in a stable posture; on the other hand, the second connection pin 24 also plays a connecting and guiding role connecting with the first connection pin 22, and the they are symmetrically arranged at the two ends of the main shaft components to achieve better force balance effect.

Embodiment Five

The reset spring 11 provided in the above embodiment is mainly used to automatically reset the clutch lever 6 and the drive sleeve 7 after the release of the clutch lever 6. During the resetting process of the drive sleeve 7, it can also act on the main shaft component to reset the main shaft component. However, due to the numerous associated components, the force exerted by a single reset spring 11 may not be sufficient, and it may be affected by the direction of force, which may cause jamming during resetting.

In order to solve the above deficiencies, the adjustments made in this embodiment are as follows: the main shaft sleeve 19 is provided with a spring 25, one end of which abuts against the fishing reel frame 1, and the other end abuts against the main shaft rod 20. Under the action of the spring 25, the main shaft rod 20 always has a movement trend away from the side where the fishing reel handle 3 is located, so that the main shaft gear 17 always has a movement trend towards meshing with the toothed bushing 18, and at the same time, the pressure of the reset spring 11 can be relieved, so that the related components can be reset smoothly and in place.

Embodiment Six

The plastic fishing reel frame 26 can reduce the overall weight and is easier to produce, thus effectively reducing costs. However, the plastic fishing reel frame 26 also has certain defects, that is, its strength is not high, resulting in related components not being securely installed and slightly lower reliability and durability when in use.

Figure 6:
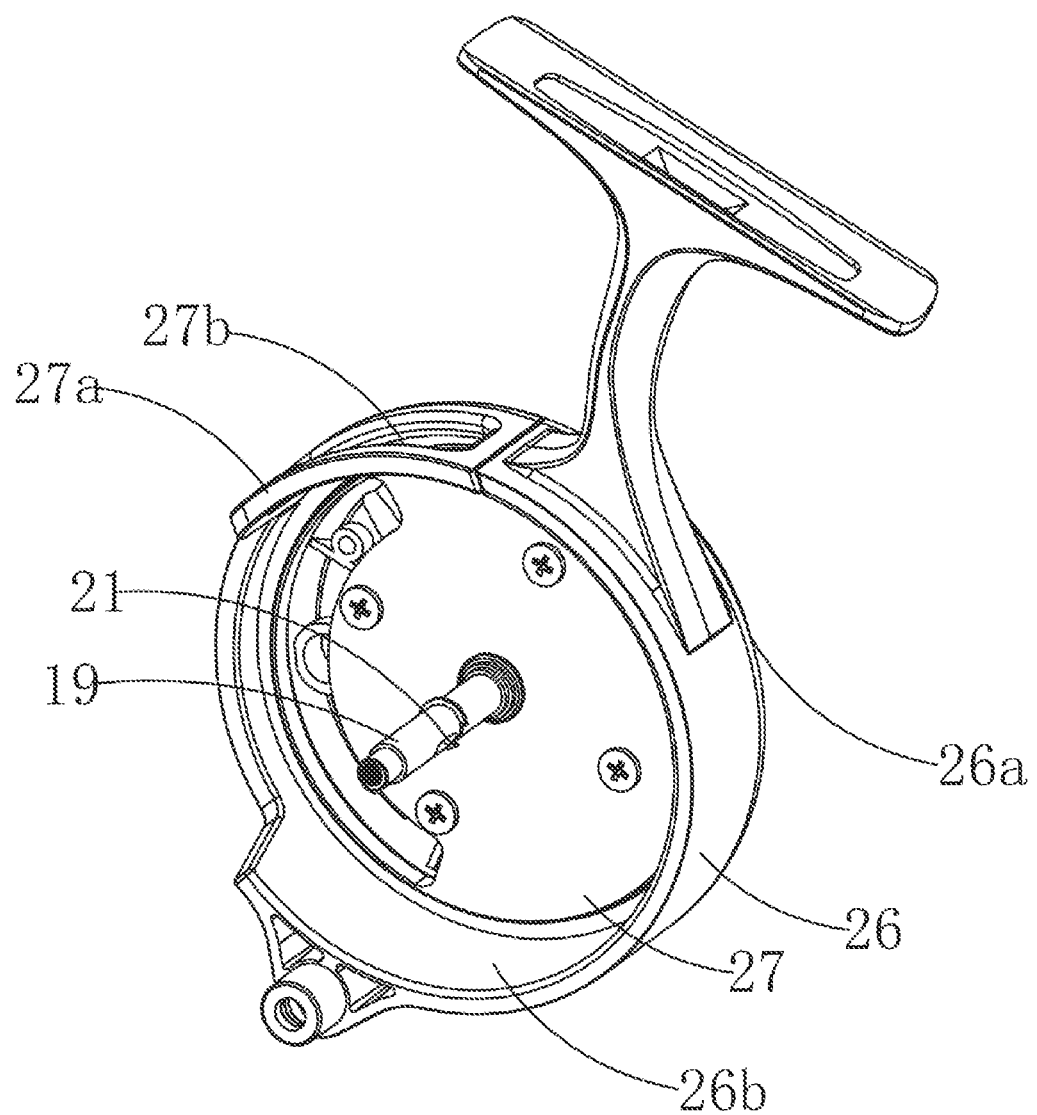
FIG. 6 is a schematic structure view of the fishing reel frame.
Figure 7:
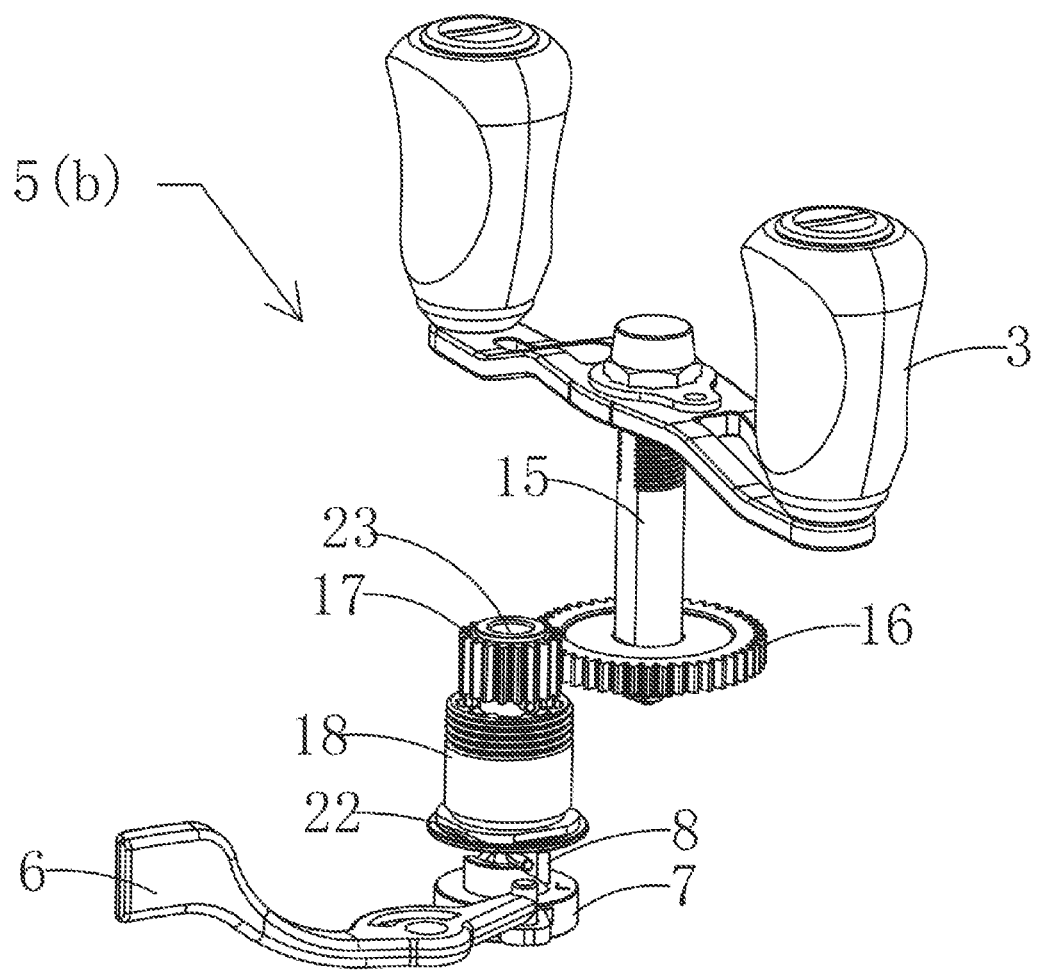
FIG. 7 is a schematic structure view of the transmission assembly and the clutch assembly in their separated state.
Figure 8:
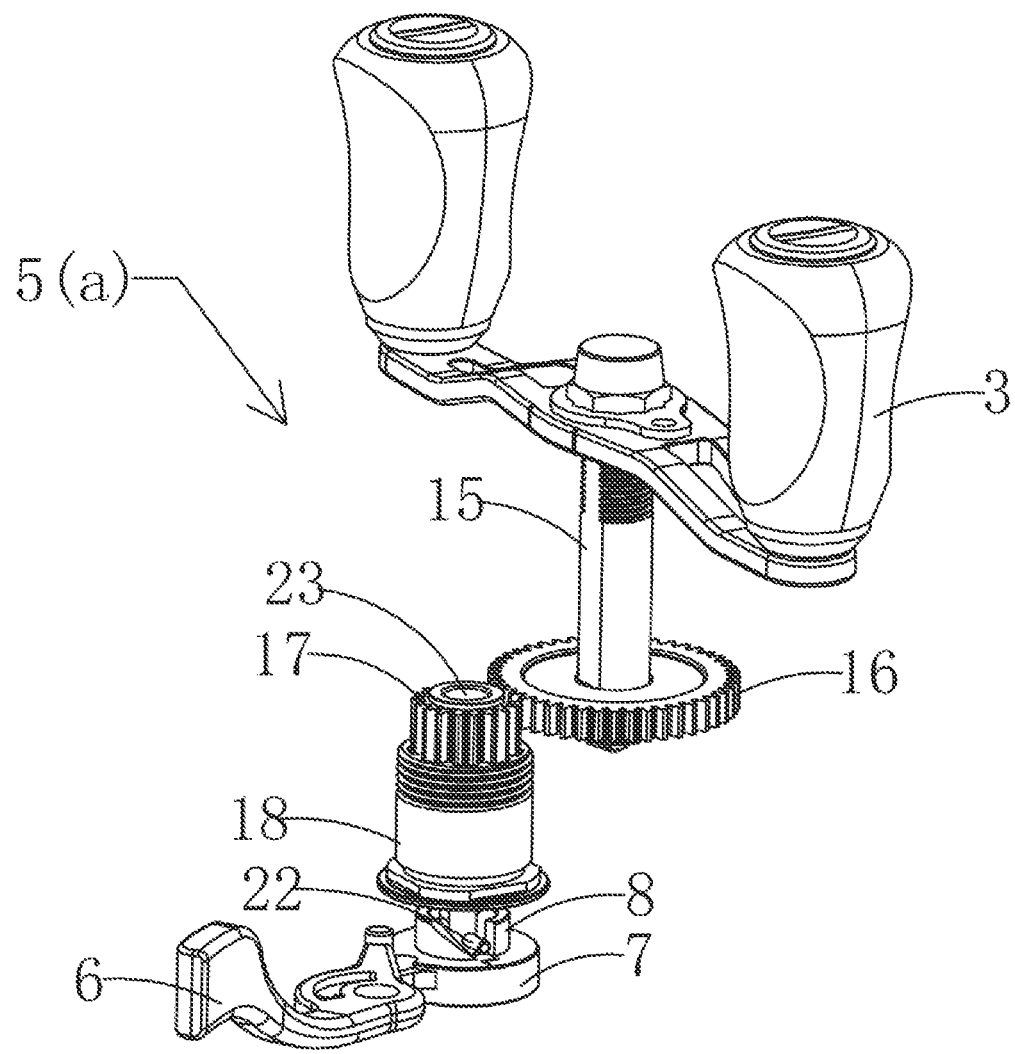
FIG. 8 is a schematic structure view of the transmission assembly and the clutch assembly in their engaged state.
Figure 9:
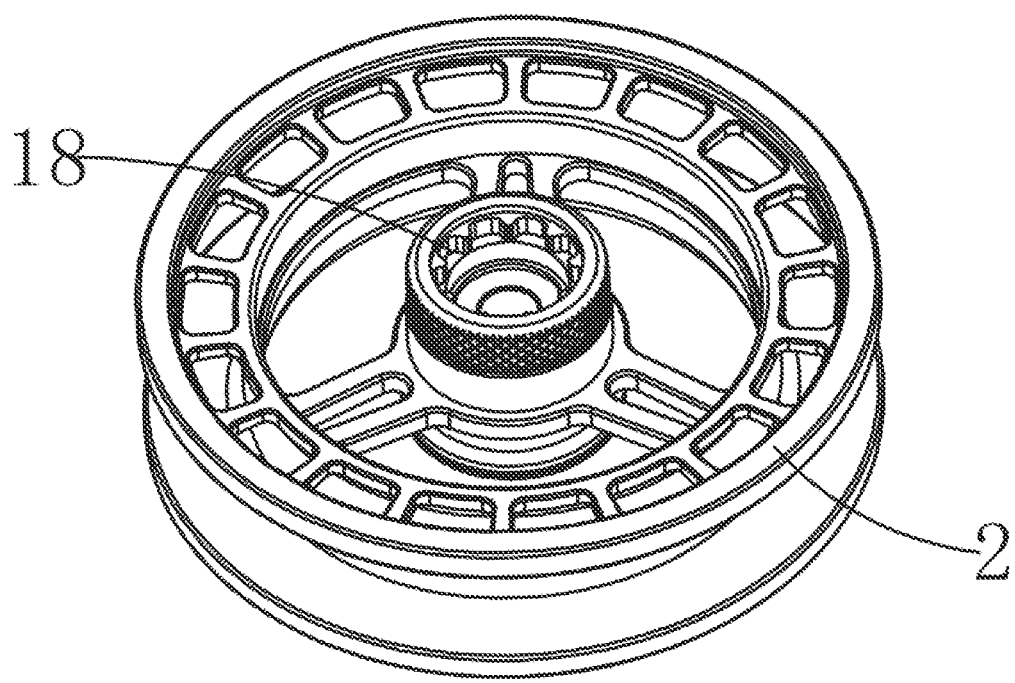
FIG. 9 is a schematic diagram of the structure of fishing reel line spool and the toothed bushing.

In order to overcome the above defects, this embodiment also provides a more preferable solution on the basis of any of the above embodiments, specifically: referring to FIG. 6, the fishing reel frame 1 is a plastic fishing reel frame 26, and a metal installation guard plate 27 is provided between the fishing reel line spool 2 and the plastic fishing reel frame 26. The metal installation guard plate 27 provides installation positions and has good pressure bearing capacity for better matching of the installation and use of the main shaft components and other components.

Furthermore, the edge of the metal installation guard plate 27 is bent to one side to form a guide part 27a, on which an outlet hole 27b is provided. The fishing line on the fishing reel line spool 2 enters and exits through the outlet hole 27b, and because the guide part 27a is integrally formed with the metal installation guard plate 27, it can also be made of metal with better strength and wear resistance to prevent being worn by the fishing line.

In some embodiments of the present disclosure, the fishing reel frame 1 has a closed side 26a and an open side 26b, the fishing reel handle 3 is provided on the open side 26b and the clutch lever 6 is provided on the closed side 26a. By adopting the double-sided setting, the user can use both hands separately when switching, that is, one hand operates the fishing reel handle 3, and the other hand drags the fishing reel frame 1 (fishing rod) while the fingers push the clutch lever 6, so the operation is more convenient and faster, and the control of the entire ice reel (fishing reel) is more stable and not easy to fall off. On the other hand, the fishing reel line spool 2 is installed on the open side 26b, so it is also easier for users to observe the real-time dynamics of the fishing reel line spool 2 when in use.

It should be noted that other technical solutions of the present disclosure belong to the prior art and are therefore not described in detail.

The above is only a preferred embodiment of the present disclosure, and it should be noted that those skill in the art can make some improvements and embellishments without departing from the concept of the present disclosure, and these improvements and embellishments shall also be regarded as within the scope of the present disclosure.

What is claimed is:

1. A fishing reel with a one-hand switching mechanism, comprising:
    a fishing reel frame;
    a fishing reel line spool, which is rotatably connected to the fishing reel frame for retrieving and releasing a fishing line;
    a fishing reel handle arranged on a side where the fishing reel line spool is located;
    a transmission assembly arranged between the fishing reel handle and the fishing reel line spool;
    a clutch assembly acting on the transmission assembly to make the transmission assembly have at least an engaged state and a disengaged state, wherein when the transmission assembly is in the engaged state, the fishing reel handle and the fishing reel line spool is in a transmission fit; and when the transmission assembly is in the disengaged state, the fishing reel handle and the fishing reel line spool is in a transmission failure, so that the fishing reel line spool rotates freely;
    wherein the clutch assembly comprises a clutch lever extending at least partially out of the fishing reel frame, and the clutch lever is located on a side of the fishing reel frame away from the fishing reel handle; and
    wherein the transmission assembly comprises a main shaft component fixed in the fishing reel frame and passing through the fishing reel line spool, and the main shaft component comprises a main shaft sleeve, and a main shaft rod sleeved in the main shaft sleeve in a manner that the main shaft rod moves back and forth along the main shaft sleeve, and wherein the main shaft sleeve is in fixed connection with the fishing reel frame.

2. The fishing reel of claim 1, wherein the clutch assembly further comprises a drive sleeve;
    wherein the clutch lever is movably installed in the fishing reel frame, an inner end of the clutch lever is in transmission connection with the drive sleeve, and an outer end of the clutch lever extends out of the fishing reel frame;
    wherein the drive sleeve is rotatably arranged in the fishing reel frame, and an upper surface of the drive sleeve is provided with drive parts with different heights that act on the transmission assembly; and
    wherein the clutch lever is configured to be actuated to make the drive sleeve rotate relative to the transmission assembly, thereby driving the transmission assembly up or down through the drive parts, and thus switching the transmission assembly between the engaged state and the disengaged state.

3. The fishing reel of claim 2, wherein the drive sleeve comprises a sleeve body, the drive parts fixed on the sleeve body, and a connection part extending outwardly from one side of the sleeve body, and wherein the clutch lever is connected with the connection part; and
    wherein a reset spring is provided between the fishing reel frame and the drive sleeve, and a through hole is provided on the sleeve body.

4. The fishing reel of claim 3, wherein at least one of the drive parts comprises two drive ribs symmetrically arranged around the through hole, and a positioning groove is provided between the two drive ribs.

5. The fishing reel of claim 1, wherein the transmission assembly further comprises a fishing reel handle shaft connected to the fishing reel handle, a fishing reel handle gear sleeved on the fishing reel handle shaft, a main shaft gear sleeved on the main shaft component, and a toothed bushing fixed in the fishing reel line spool; and
    wherein the fishing reel handle gear is meshed with the main shaft gear, and the main shaft gear forms an engageable connection with the toothed bushing.

6. The fishing reel of claim 5, wherein the main shaft sleeve is provided with a track groove, and the main shaft rod is provided with a first connection pin which is inserted into the track groove.

7. The fishing reel of claim 5, wherein the main shaft sleeve is provided with a spring, one end of which abuts against the fishing reel frame and the other end abuts against the main shaft rod.

8. The fishing reel of claim 5, wherein a positioning sleeve is further provided between the main shaft sleeve and the main shaft gear, wherein one end of the positioning sleeve is provided with a press cover which abuts against a first end face of the main shaft gear, the other end is provided with a second connection pin, which abuts against with a second end face of the main shaft gear, and wherein the second connection pin is provided between the main shaft sleeve and the main shaft rod.

9. The fishing reel of claim 1, wherein the fishing reel frame is a plastic fishing reel frame, a metal installation guard plate is provided between the fishing reel line spool and the plastic fishing reel frame, and an edge of the metal installation guard plate is bent to one side to form a guide part, the guide part is provided with an outlet hole; and wherein the fishing reel frame has a closed side and an open side, the fishing reel handle is arranged on the open side and the clutch lever is arranged on the closed side of the fishing reel frame.

\* \* \* \* \*